A. R. GANO.
PORTABLE POWER SAW.
APPLICATION FILED OCT. 13, 1919.
1,358,197.
Patented Nov. 9, 1920.
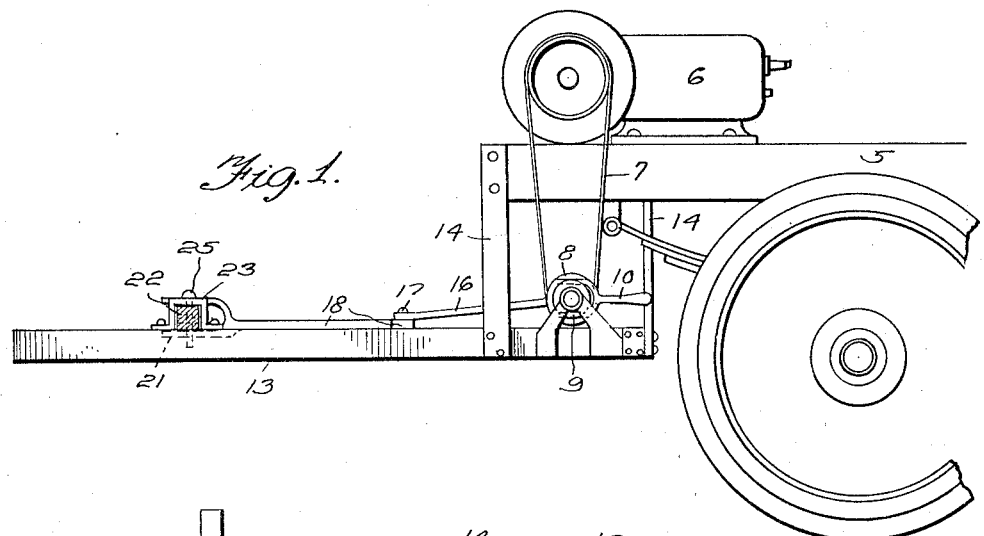
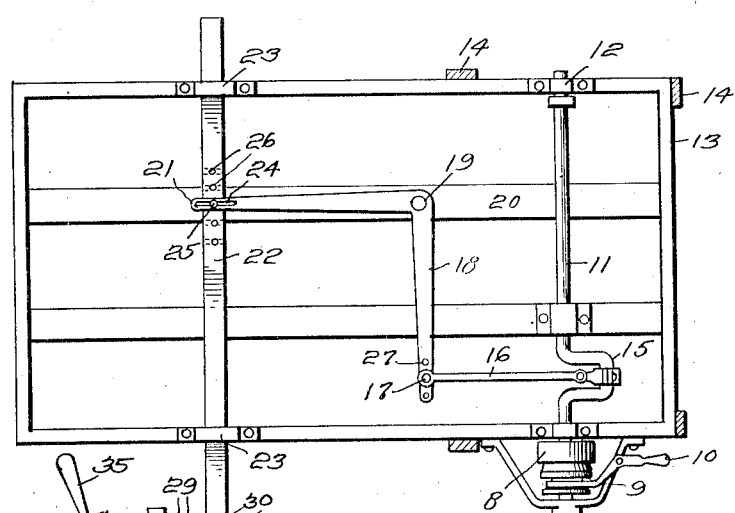
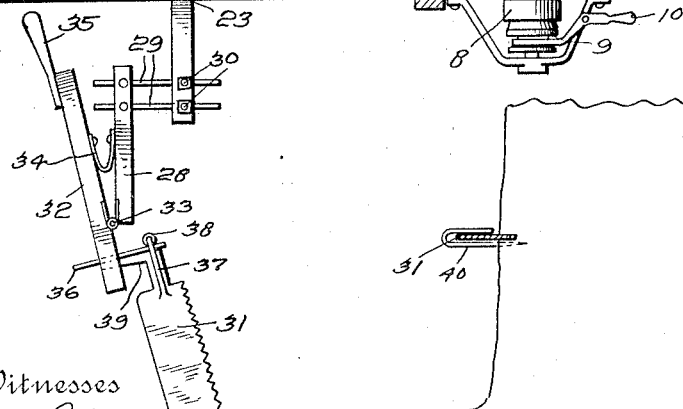
Witnesses
Inventor
A. R. Gano,
By Shepherd Campbell
Attorney

UNITED STATES PATENT OFFICE.

ARMSTRONG R. GANO, OF SULPHUR SPRINGS, ARKANSAS.

PORTABLE POWER-SAW.

1,358,197.  Specification of Letters Patent.  Patented Nov. 9, 1920.

Application filed October 13, 1919. Serial No. 330,187.

*To all whom it may concern:*

Be it known that I, ARMSTRONG R. GANO, a citizen of the United States, residing at Sulphur Springs, in the county of Benton and State of Arkansas, have invented certain new and useful Improvements in Portable Power-Saws, of which the following is a specification.

This invention relates to power saws and it has for its object the provision of a power driven cross cut saw adapted for use in felling standing timber or in sawing up logs lying upon the ground.

Further objects and advantages of the invention will be set forth in the detailed description which now follows.

In the accompanying drawing—

Figure 1 is a fragmentary side elevation of a motor vehicle having my invention applied thereto and with the actuating bar of the saw in section;

Fig. 2 is a plan view of the frame carrying the saw actuating element; and

Fig. 3 is a detailed view illustrating a guide employed in starting the saw.

Like numerals designate corresponding parts throughout the several figures of the drawing.

Referring to the drawing 5 designates the rear end of a wheeled vehicle which may be a motor truck or the like, and 6 designates a motor, such as a gasolene engine which applies power through a belt 7 to the loose pulley 8 of a friction clutch indicated at 9 and operable by means of a handle 10 to impart movement to a main drive shaft 11 from the loose pulley 8. The main drive shaft is mounted in bearings 12 of a frame 13 that is hung by supports 14 to the rear end of the truck 5. The drive shaft 11 includes within its length a crank 15 that imparts motion to a connecting rod 16 the latter being pivotally connected at 17 to one arm of a bell crank lever 18. This bell crank lever 18 is pivoted at 19 to a longitudinal member 20 of the frame and carries a yoke 21 adapted to embrace a bar 22 that is square in cross section and constitutes the main actuating member of the saw. The bar 22 is mounted to slide in bearings 23 of the frame and the yoke 21 is slotted at 24 for the reception of a pin 25 that is adapted to engage in any one of the openings 26 formed in the bar 22. In like manner the pivot 17 may engage in any of the openings 27 of the bell crank lever to thereby vary the stroke of the saw.

The saw is illustrated in Fig. 2, in the position that it occupies when making a horizontal cut to fell standing timber, but as this description proceeds it will be seen that by giving the square bar 22 a quarter turn in the bearing 23, the saw will be brought to a vertical position to adapt it to cut up timber lying on the ground.

A head block 28 is carried by a pair of adjusting rods 29 and these rods are in turn adjustable through the bar 22 by means of set screws 30. Therefore when the saw is making a vertical cut the saw may be given a vertical adjustment with relation to the log to be sawed, or the saw may be adjusted to a limited extent toward or from the work when making a horizontal cut. The saw 31 is carried by a swinging block 32 that is hingedly connected at 33 to the head block 28, and a spring 34 bears between the head block and the swinging block and normally tends to move the saw toward the work. A handle 35 provides means for withdrawing the saw from the work. A detachable connection between the saw 31 and the swinging block 32 is provided by means of a rod 36 that is carried by the block 32, a yoke 37 that is carried by the saw and which in turn carries a roller 38 and a wedge shaped extension 39 upon the saw that is adapted to engage in a correspondingly shaped opening in the block 32. To support the saw during its initial movement and until it has entered the wood a sufficient distance to be self supporting, I provide a J shaped, staple-like member, one leg of which is sharpened to adapt it to be driven into a log in the manner indicated in Fig. 3.

In operation, rotation of the shaft 11 under the influence of the motor 6 imparts reciprocation to the bar 22 through the connections described and consequently imparts a reciprocation to the saw. This saw, being engaged with the work and being supported during its initial movement by the staple-like member 40, bites into the wood to be sawed under the influence of the spring 34.

It is to be understood that the invention is not limited to the precise construction set forth but that it includes within its purview whatever changes fairly come within the spirit of the appended claims.

Having described my invention, what I claim is:

1. A device of the character described comprising a longitudinally reciprocable bar, angular in cross section, and bearings in which said bar slides, a saw, a head block adjustable laterally with respect to the bar and a spring actuated swinging block by which the saw is carried, said swinging block in turn being hingedly connected to the head block.

2. In a device of the character described the combination with a portable supporting frame of bearings carried thereby, a bar angular in cross section slidably mounted in said bearings and capable of being turned to occupy two positions one of which is at right angles to the other, a head block, means for mounting said head block upon the outer end of said bar for adjustment laterally toward and from said bar, a swinging block having its side hinged to an outer corner of the head block and lying at an angle to said head block, a compression spring disposed between the head block and the swinging block, a saw connected to that end of the swinging block which projects beyond the head block and means for imparting reciprocation to the bar.

In testimony whereof I affix my signature.

ARMSTRONG R. GANO.